United States Patent [19]

Miller et al.

[11] Patent Number: 5,441,866
[45] Date of Patent: Aug. 15, 1995

[54] SENSITIZERS FOR PHOTOTHERMOGRAPHIC ELEMENTS

[75] Inventors: James R. Miller, Hudson, Wis.; Sam Kalousdian, Maplewood, Minn.; Brian C. Willett, Stilwater, Minn.; John M. Winslow, South St. Paul, Minn.; Pu Zhou, Woodbury, Minn.; Chaofeng Zou, Maplewood, Minn.

[73] Assignee: Minnesota Mining and Manufacturing Company, St. Paul, Minn.

[21] Appl. No.: 377,619

[22] Filed: Jan. 26, 1995

Related U.S. Application Data

[63] Continuation of Ser. No. 202,941, Feb. 28, 1994, abandoned.

[51] Int. Cl.$^6$ .............................................. G03C 1/498
[52] U.S. Cl. ..................................... 430/619; 430/576; 430/581; 430/583; 430/584; 430/594; 430/603; 430/611; 430/613; 430/617
[58] Field of Search ............... 430/619, 617, 576, 584, 430/594, 581, 583, 611, 6131603

[56] References Cited

U.S. PATENT DOCUMENTS

| | | | |
|---|---|---|---|
| 2,096,842 | 10/1937 | Brunken et al. | 260/44 |
| 2,131,853 | 10/1938 | Dieterle et al. | 260/240 |
| 3,457,078 | 7/1969 | Riester . | |
| 3,582,344 | 6/1971 | Heseltine | 430/584 |
| 4,461,828 | 7/1984 | Metz et al. | 430/592 |
| 4,603,104 | 7/1986 | Philip, Jr. | 430/584 |
| 4,619,892 | 10/1986 | Simpson et al. | 430/505 |
| 4,639,414 | 1/1987 | Sakaguchi | 430/550 |
| 4,741,996 | 5/1988 | Aotsuka et al. | 430/559 |
| 4,835,096 | 5/1989 | Lea | 430/584 |
| 4,975,362 | 12/1990 | Parton et al. | 430/584 |
| 5,013,642 | 5/1991 | Muenter et al. | 430/574 |
| 5,108,882 | 4/1992 | Parton et al. | 430/584 |
| 5,258,282 | 11/1993 | Kagami et al. | 430/619 |
| 5,387,502 | 2/1995 | Inagaki | 430/584 |
| 5,393,654 | 2/1995 | Burrows et al. | 430/584 |

FOREIGN PATENT DOCUMENTS

| | | |
|---|---|---|
| 58-145936 | 8/1983 | Japan . |
| 3-163440 | 7/1991 | Japan . |
| 4-182639 | 6/1992 | Japan . |
| 4-311948 | 11/1992 | Japan . |
| 4-358141 | 12/1992 | Japan . |
| 4-362932 | 12/1992 | Japan . |
| 5-19432 | 1/1993 | Japan . |
| 5-45776 | 2/1993 | Japan . |
| 425417 | 3/1935 | United Kingdom . |

OTHER PUBLICATIONS

"Polymeric Dyes with Two Condensed Hydrocarbon Radicals in the Chromophore", A. I. Tolmachev et al., Institute of Organic Chemistry, Academy of Sciences of the UKrSSR (pp. 1136–1138). Translated from Doklady Adademii Nauk SSSR, vol. 177, No. 4, pp. 869–872, Dec. 1967. Original article submitted Jul. 24, 1967.
Research Disclosure, No. 17363, Sep. 1978.

*Primary Examiner*—Thorl Chea
*Attorney, Agent, or Firm*—Gary L. Griswold; Walter N. Kirn; Gregory A. Evearitt

[57] ABSTRACT

Photothermographic elements of the photothermographic type may be sensitized to the infrared with sensitizing dyes of the formula:

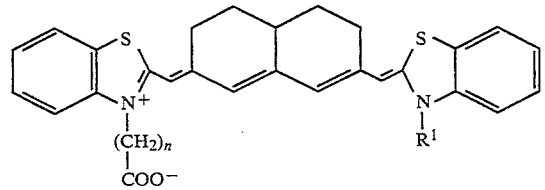

wherein:
  $R^1$ represents a $(CH_2)_n$—$COO^-$ group of from 1–20 carbon atoms, or an alkyl group of from 1 to 20 carbon atoms; and
  n is an integer from 1 to 20.

14 Claims, No Drawings

SENSITIZERS FOR PHOTOTHERMOGRAPHIC ELEMENTS

This is a continuation of application Ser. No. 08/202,941 filed Feb. 28, 1994, now abandoned.

BACKGROUND OF THE INVENTION.

1. Field of Invention

This invention relates to rigidized, carboxyalkyl substituted heptamethine cyanine dyes and their use as spectral sensitizers in photothermographic imaging elements. These elements find use in photothermographic articles and constructions.

2. Background of the Invention

Silver halide-containing, photothermographic imaging articles (i.e., heatdevelopable photographic articles) processed with heat, and without liquid development, have been known in the art for many years. These articles, also known as "dry silver" compositions or emulsions, generally comprise a support having coated thereon: (1) a photosensitive compound that generates atomic silver when irradiated, (2) a non-photosensitive, reducible silver source, (3) a reducing agent for the non-photosensitive, reducible silver source, and (4) a binder. The photosensitive compound is generally photographic silver halide which must be in catalytic proximity to the non-photosensitive, reducible silver source. Catalytic proximity requires an intimate physical association of these two materials so that when silver specks or nuclei are generated by the irradiation or light exposure of the photographic silver halide, those nuclei are able to catalyze the reduction of the reducible silver source. It has long been understood that elemental silver ($Ag°$) is a catalyst for the reduction of silver ions, and a progenitor of the photosensitive photographic silver halide may be placed into catalytic proximity with the non-photosensitive, reducible silver source in a number of different fashions, such as by partial metathesis of the reducible silver source with a halogen-containing source (see, for example, U.S. Pat. No. 3,457,075), coprecipitation of silver halide and reducible silver source compound (see, for example, U.S. Pat. No. 3,839,049), and other methods that intimately associate the photosensitive photographic silver halide and the non-photosensitive, reducible silver source.

The non-photosensitive, reducible silver source is a compound that contains silver ions. The preferred non-photosensitive reducible silver source comprises silver salts of long chain aliphatic carboxylic acids, typically having from 10 to 30 carbon atoms. The silver salt of behenic acid or mixtures of acids of similar molecular weight are generally used. Salts of other organic acids or other organic compounds, such as silver imidazolates, have been proposed, and U.S. Pat. No. 4,260,677 discloses the use of complexes of inorganic or organic silver salts as non-photosensitive, reducible silver sources.

In both photographic and photothermographic emulsions, exposure of the photographic silver halide to light produces small clusters of silver atoms ($Ag°$). The imagewise distribution of these clusters is known in the art as a latent image. This latent image generally is not visible by ordinary means and the photosensitive emulsion must be further processed in order to produce a visible image. The visible image is produced by the reduction of silver ions, which are in catalytic proximity to silver halide grains beating the clusters of silver atoms, i.e. the latent image. This produces a black and white image.

As the visible image is produced entirely by elemental silver ($Ag°$), one cannot readily decrease the amount of silver in the emulsion without reducing the maximum image density. However, reduction of the amount of silver is often desirable in order to reduce the cost of raw materials used in the emulsion.

A variety of ingredients may be added to these basic components to enhance performance. For example, toning agents may be incorporated to improve the color of the silver image of the photothermographic emulsions, as described in U.S. Pat. Nos. 3,846,136; 3,994,732; and 4,021,249.

One conventional way of attempting to increase the maximum image density of photographic and photothermographic emulsions without increasing the amount of silver in the emulsion layer is by incorporating dye-forming compounds in the emulsion. Color images can be formed by incorporation of leuco dyes into the emulsion. Leuco dyes are the reduced form of a color-bearing dye. Upon imaging, the leuco dye is oxidized, and the color-bearing dye and a reduced silver image are simultaneously formed in the exposed region. In this way, a dye enhanced silver image can be produced, as shown, for example, in U.S. Pat. Nos. 3,531,286; 4,187,108; 4,426,441; 4,374,921; and 4,460,681.

Multicolor photothermographic imaging elements typically comprise two or more monocolor-forming emulsion layers (often each emulsion layer comprises a set of bilayers containing the color-forming reactants) maintained distinct from each other by barrier layers. The barrier layer overlaying one photosensitive, photothermographic emulsion layer typically is insoluble in the solvent of the next photosensitive, photothermographic emulsion layer. Photothermographic elements having at least 2 or 3 distinct color-forming emulsion layers are disclosed in U.S. Pat. Nos. 4,021,240 and 4,460,681. Various methods to produce dye images and multicolor images with photographic color couplers and leuco dyes are well known in the art as represented by U.S. Pat. Nos. 4,022,617; 3,531,286; 3,180,731; 3,761,270; 4,460,681; 4,883,747; and *Research Disclosure*, Mar. 1989, item 29963.

Many cyanine and related dyes are well known for their ability to impart spectral sensitivity to a gelatino silver halide element. The wavelength of peak sensitivity is a function of the dye's wavelength of peak light absorbance. While many such dyes provide some spectral sensitization in photothermographic formulations the dye sensitization is often very inefficient and it is not possible to translate the performance of a dye in gelatino silver halide elements to photothermographic elements. The emulsion making procedures and chemical environment of photothermographic elements are very harsh compared to those of gelatino silver halide elements. The presence of large surface areas of fatty acids and fatty acid salts restricts the surface deposition of sensitizing dyes onto silver halide surfaces and may remove sensitizing dye from the surface of the silver halide grains. The large variations in pressure, temperature, pH and solvency encountered in the preparation of photothermographic formulation aggravate the problem. Thus sensitizing dyes which perform well in gelatino silver halide elements are often inefficient in photothermographic formulations. In general, it has been found that merocyanine dyes are superior to cyanine dyes in photothermographic formulations as disclosed, for example, in British Patent No 1,325,312 and U.S. Pat. No. 3,719,495.

Attempts to sensitize at the far red end of spectrum have produced somewhat variable results. In particular, the use of cyanine dyes to impart sensitivity in photothermographic elements in the far red and near infrared has given results quite inconsistent with the performance of such dyes in conventional gelatino silver halide elements. The art therefore leads towards modifying merocyanines. There are however very few merocyanines capable of absorbing at more than 750 nm and also there is uncertainty as to whether dyes which absorb at such wavelengths will also sensitize.

The recent commercial availability of relatively high powered semiconductor light sources, and particularly laser diodes which emit in the red and near-infrared region of the electromagnetic spectrum, as sources for output of electronically stored image data onto photosensitive film or paper is becoming increasingly widespread. This has led to a need for high quality imaging articles which are sensitive in the near infrared region and has created a need to sensitize photothermographic elements to match such exposure sources. In particular, it is necessary to match sources emitting in the wavelength range from 780 to 850 nm, which is towards the extreme end of sensitizing dye art. Such articles find particular utility in laser scanning.

Although spectral sensitizing dyes for photothermographic elements are now known which absorb in the 780–850 nm wavelength range, such dyes are often unstable (i.e., decompose) during storage in the coated film. Thus, a need exists for photothermographic spectral sensitizing dyes which absorb at 780–850 nm and which have improved shelf-life stability. Increased sensitivity and contrast in such dyes would also be desirable.

SUMMARY OF THE INVENTION

In one embodiment, the present invention provides heat-developable, photothermographic elements comprising a support beating at least one photosensitive, image-forming photothermographic emulsion layer comprising:
(a) a photosensitive silver halide;
(b) a non-photosensitive, reducible silver source;
(c) a reducing agent for silver ions;
(d) a binder;
(e) a supersensitizer; and
(f) a spectrally sensitizing amount of a compound having the central nucleus:

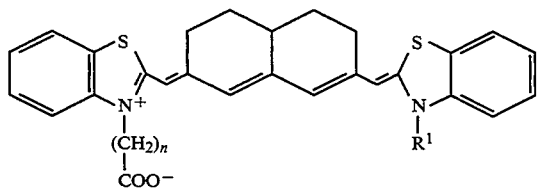

I wherein:
$R^1$ represents a $(CH_2)_n$—COO$^-$ group of from 1–20 carbon atoms, preferably of from 1 to 10 carbon atoms, or an alkyl group of from 1 to 20 carbon atoms, and
n is an integer from 1 to 20.

The rigidized, carboxyalkyl substituted heptamethine cyanine dyes having the central nucleus I have been found to possess unexpected and particularly advantageous properties for the spectral sensitization of photothermographic imaging elements. Specifically, such dyes provide the elements of this invention with high photographic speed (i.e., sensitivity), excellent contrast, and improved shelf-life stability. Surprisingly, the speed and contrast provided by the rigidized dyes having the central nucleus I are superior to the speed and contrast provided by non-rigidized dyes of similar structure and are also superior to the speed and contrast provided by rigidized dyes not containing at least one alkylcarboxy group.

The reducing agent for the reducible source of silver may be a compound that can be oxidized to form or release a dye.

The photothermographic elements of this invention may be used to prepare black-and-white, monochrome, or full color images. The photothermographic element of this invention can be used, for example, to manufacture photothermographic articles for conventional black-and-white or color photothermography, in electronically generated black and white or color hardcopy recording, in the graphic arts area, and in digital color proofing.

As used herein, the term "emulsion layer" means a layer of a photothermographic element that contains photosensitive silver halide, silver source compound, a spectral sensitizing dye, a binder, and a reducing agent.

As is well understood in this technical area, a large degree of substitution is not only tolerated, but is also often advisable and substitution is anticipated on the compounds of the present invention.

When a general structure is referred to as "a compound having the central nucleus" of a given formula, any substitution which does not alter the bond structure of the formula or the shown atoms within that structure is included within the formula. For example, where there is a rigidized polymethine chain shown between two defined benzothiazole groups, substituent groups may be placed on the chain, on the rings in the chain, or on the benzothiazole groups, but the conjugation of the chain may not be altered and the atoms shown in the chain or in the benzothiazole groups may not be replaced.

When a general structure is referred to as "a general formula" it does not specifically allow for such broader substitution of the structure.

As a means of simplifying the description of substituent groups, the terms "group" and "moiety" are used to differentiate between those chemical species that may be substituted and those which may not be so substituted. Thus, when the term "group" (e.g., "aryl group") is used to describe a substituent, that substituent includes the use of additional substituents beyond the literal definition of the basic group. Where the term "moiety" is used to describe a substituent, only the unsubstituted group is intended to be included. For example, the phrase, "alkyl group" is intended to include not only pure hydrocarbon alkyl chains, such as methyl, ethyl, propyl, t-butyl, cyclohexyl, iso-octyl, octadecyl and the like, but also alkyl chains bearing substituents known in the art, such as hydroxyl, alkoxy, phenyl, halogen atoms (F, Cl, Br, and I), cyano, nitro, amino, carboxy, etc. For example, alkyl group includes ether groups (e.g., $CH_3$—$CH_2$—$CH_2$—O—$CH_2$—), haloalkyls, nitroalkyls, carboxyalkyls, hydroxyalkyls, sulfoalkyls, etc. On the other hand, the phrase "alkyl moiety" is limited to the inclusion of only pure hydrocarbon alkyl chains, such as methyl, ethyl, propyl, t-butyl, cyclohexyl, iso-octyl, octadecyl, and the like. Substituents which react with active ingredients, such as very strongly electrophilic or oxidizing substituents, would of course be excluded by the ordinarily skilled artisan as not being inert or harmless.

Other aspects, advantages, and benefits of the present invention are apparent from the detailed description, examples, and claims.

DETAILED DESCRIPTION OF THE INVENTION

The dyes having the central nucleus I are particularly effective sensitizers for photothermographic elements and give surprisingly better sensitivity to near infrared radiation and exhibit superior shelf-life stability than other heptamethine cyanines of similar structure. In many cases, compounds of the invention were found to give at least two times the sensitivity than that obtained using similar compounds not possessing the rigidized structure and at least one alkylcarboxy group. The dyes are particularly useful for sensitizing photothermographic elements in the region 780 to 850 nm thereby providing photothermographic elements which are well matched to sources emitting in that region, e.g., an infrared emitting diode (IRED).

Heptamethine cyanine dyes are well known and described in the literature, as compounds and as near infrared spectral sensitisers for conventional photographic silver halide emulsions, e.g., Hamer, *Cyanine Dyes and Related Compounds*, Interscience 1964. The synthesis of heptmethine cyanines is described, e.g., by Fischer and Hamer, *J. Chem. Soc.* 1933, 189.

The preparation of infrared-absorbing dyes usually requires the presence of a long chain (e.g., a heptamethine chain) within the chromophoric system. However, as the chain length is increased, there is a concommitant decrease in dye stability.

Rigidization by incorporating a tetrahydronaphthyl group into the polymethine chain of a cyanine dye having two benzothiazole groups was found to increase spectral sensitivity and shelf-life in the coated film as compared to nonrigidized dyes similarly stored. Surprisingly, the addition of an alkyl carboxy group to at least one of the nitrogen atoms of the two benzothiozole groups has been found to produce further increases in sensitivity as well as improvements in contrast as compared to dyes which lack these features. The compounds having the central nucleus I describe such dyes. As is demonstrated in the Examples below, this technology has been successfully applied to photothermographic constructions.

It is preferred that the heptamethin cyanine dye not have strongly electron withdrawing groups on the dye nucleus. The Hammett sigma value ($\sigma$) is an accepted measure of a group's electron-donating and electron-withdrawing ability, especially the sigma para value ($\sigma_p$) under conditions of conjugation. It is preferred that the nucleus of the dyes of this invention not have ($\sigma_p$) values more positive than $+0.50$ as shown for example in C. D. Ritchie and W. F. Sager *Progr. Phys. Org. Chem.* 1964 2, 323.

The compounds having the central nucleus I may be incorporated into the photothermographic emulsions as spectral sensitizers in a conventional manner. Generally the concentration of the compounds having the central nucleus I will be in the range $2 \times 10^{-8}$ to $4 \times 10^{-2}$ moles of sensitizing dye per mole of silver in the emulsion, preferably $2 \times 10^{-6}$ to $4 \times 10^{-3}$ moles of sensitizing dye per mole of silver, and most preferably $1 \times 10^{-4}$ to $2 \times 10^{-4}$ moles of sensitizing dye per mole of silver in the emulsion.

The Supersensitizer

The supersensitizer has been found to enhance the efficiency of the sensitizing dye of the present invention, and is preferably selected from the group consisting of aromatic, heterocyclic mercapto or disulphide compounds as described in U.S. patent application Ser. No. 08/091,000, filed Jul. 13, 1993. More preferred supersensitizers are mercapto-substituted benzimidazoles, benzoxazoles, and benzothiazoles, such as 5-methyl-2-mercaptobenzimidazole, 2-mercaptobenzimidazole, 2-mercaptobenzoxazole, 2-mercaptobenzothiazole, and 2-mercapto-5-methylbenzimidazole. Other mercapto-substituted, heteroaromatic compounds which may be used as supersensitizers include: 6-ethoxy-2-mercaptobenzothiazole, 2,2'-Dithiobis-(benzothiazole), 3-mercapto-1,2,4-triazole, 4,5-diphenyl-2-imadazolethiol, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thiadiazole, 3-amino-5-mercapto- 1,2,4-triazole, 4-hydroxy-2-mercaptopyrimidine, 2-mercaptopyrimidine, 4,6-diamino-2-mercaptopyrimidine, 2-mercapto-4-mercaptopyrimidine, hydrochloride, 3-mercapto-5-phenyl-1,2,4-triazole, 2-mercapto-4-phenyloxazole.

The supersensitizers may be present in the emulsion layer in an amount ranging from 0.001 to 1.0 moles of supersensitizer per mole of silver, and preferably between 0.01 and 0.3 moles of supersensitizer per mole of non-photosensitive reducible silver source.

The Photosensitive Silver Halide

The photosensitive silver halide can be any photosensitive silver halide, such as silver bromide, silver iodide, silver, chloride, silver bromoiodide, silver chlorobromoiodide, silver chlorobromide, etc. The photosensitive silver halide can be added to the emulsion layer in any fashion so long as it is placed in catalytic proximity to the organic silver compound which serves as a source of reducible silver.

The light sensitive silver halide used in the present invention can be employed in a range of 0.005 mole to 0.5 mole and, preferably, from 0.01 mole to 0.15 mole per mole of silver salt.

The silver halide used in the present invention may be employed without modification. However, it can be chemically sensitized in a manner similar to that used to sensitize conventional wet process silver halide or state-of-the-art heat-developable photographic elements. For example, it may be chemically sensitized with a chemical sensitizing agent such as a compound containing sulfur, selenium or tellurium etc., or a compound containing gold, platinum, palladium, ruthenium, rhodium or iridium, etc., a reducing agent such as a tin halide, etc., or a combination thereof. The details of these procedures are described in T. H. James, *The Theory of the Photographic Process*, Fourth Edition, Chapter 5, pages 149 to 169. Suitable chemical sensitization procedures are also described in Shepard, U.S. Pat. No. 1,623,499; Waller, U.S. Pat. No. 2,399,083; McVeigh, U.S. Pat. No. 3,297,447; and Dunn, U.S. Pat. No. 3,297,446.

The Non-Photosensitive Reducible Silver Source

The non-photosensitive, reducible silver source can be any compound that contains a source of reducible silver ions. Silver salts of organic acids, particularly silver salts of long chain fatty carboxylic acids, are preferred. The chains typically contain 10 to 30, preferably 15 to 28 carbon atoms. Complexes of organic or inorganic silver salts, wherein the ligand has a gross stability constant for silver ion of between 4.0 and 10.0, are also useful in this invention.

The organic silver salt which can be used in the present invention is a silver salt which is comparatively stable to light, but forms a silver image when heated to 80° C. or higher in the presence of an exposed photocatalyst (such as silver halide) and a reducing agent.

Suitable organic silver salts include silver salts of organic compounds having a carboxyl group. Preferred examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laureate, silver caprate, silver myristate, silver palmitate, silver maleate, silver fumarate, silver tartarate, silver furoate, silver linoleate, silver butyrate and silver camphorate, mixtures thereof, etc. Silver salts which are substitutable with a halogen atom or a hydroxyl group can also be effectively used. Preferred examples of the silver salts of aromatic carboxylic acid and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, etc., silver gallate, silver tannate, silver phthalate, silver terephthalate, silver salicylate, silver phenylacetate, silver pyromellilate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663.

Silver salts of compounds containing mercapto or thione groups and derivatives thereof can be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethylglycolamido)benzothiazole, a silver salt of thioglycolic acid such as a silver salt of a S-alkylthioglycolic acid (wherein the alkyl group has from 12 to 22 carbon atoms) as described in Japanese patent application No. 28221/73, a silver salt of a dithiocarboxylic acid such as a silver salt of dithioacetic acid, a silver salt of thioamide, a silver salt of 5-carboxylic-1-methyl-2-phenyl-4-thiopyridine, a silver salt of mercaptotrazine, a silver salt of 2-mercaptobenzoxazole, a silver salt as described in U.S. Pat. No. 4,123,274, for example, a silver salt of 1,2,4-mercaptothiazole derivative such as a silver salt of 3-amino-5-benzylthio-1,2,4-thiazole, a silver salt of a thione compound such as a silver salt of 3-(2-carboxyethyl)-4-methyl-4-thiazoline-2-thione as disclosed in U.S. Pat. No. 3,201,678.

Furthermore, a silver salt of a compound containing an imino group can be used. Preferred examples of these compounds include a silver salt of benzothiazole and a derivative thereof as described in Japanese patent publications Nos. 30270/69 and 18146/70, for example, a silver salt of benzothiazole such as silver salt of methylbenzotriazole, etc., a silver salt of a halogen-substituted benzotriazole, such as a silver salt of 5-chlorobenzotriazole, etc., a silver salt of 1,2,4-triazole, of 1H-tetrazole as described in U.S. Pat. No. 4,220,709, a silver salt of imidazole and an imidazole derivative, and the like.

It is also found convenient to use silver half soaps, of which an equimolar blend of silver behenate and behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing not more than about 4 or 5 percent of free behenic acid and analyzing about 25.2 percent silver may be used.

The method used for making silver soap dispersions is well known in the art and is disclosed in *Research Disclosure* April 1983 (22812), *Research Disclosure October* 1983 (23419) and U.S. Pat. No. 3,985,565.

The silver halide may be pre-formed by any means, e.g., in accordance with U.S. Pat. No. 3,839,049. Methods of preparing these silver halide and organic silver salts and manners of blending them are described in Research Disclosures, No. 170-29, Japanese patent application Nos. 32928/75 and 42529/76. U.S. Pat. No. 3,700,458, and Japanese patent application Nos. 13224/74 and 17216/75.

Pre-formed silver halide emulsions in the elements of this invention can be unwashed or washed to remove soluble salts. In the latter case the soluble salts can be removed by chill-setting and leaching or the emulsion can be coagulation washed, e.g., by the procedures described in Hewitson, et al., U.S. Pat. No. 2,618,556; Yutzy et al., U.S. Pat. No. 2,614,928; Yackel, U.S. Pat. No. 2,565,418; Hart et al., U.S. Pat. No. 3,241,969; and Waller et al., U.S. Pat. No. 2,489,341. The silver halide grains may have any crystalline habit including, but not limited to, cubic, tetrahedral, orthorhombic, tabular, laminar, platelet, etc. The silver halide grains may have a graded halide content, with a continuously varying ration of, for example silver bromide and silver iodide; or they may be of the core-shell-type, having a discrete core of one halide ratio, and a discrete shell of another halide ratio.

The silver halide and the non-photosensitive reducible silver source compound that form a starting point of development should be in reactive association. By "reactive association" is meant that they should be in the same layer, in adjacent layers, or in layers separated from each other by an intermediate layer having a thickness of less than 1 micrometer (1μm). It is preferred that the silver halide and the non-photosensitive reducible silver source compound be present in the same layer.

Photothermographic emulsions containing preformed silver halide in accordance with this invention can be sensitized with chemical sensitizers, or with spectral sensitizers as described above.

The source of reducible silver generally constitutes from 15 to 70 percent by weight of the emulsion layer. It is preferably present at a level of 30 to 55 percent by weight of the emulsion layer.

The Reducing Agent for the Non-Photosensitive Reducible Silver Source

The reducing agent for the organic silver salt may be any compound, preferably an organic compound, that can reduce silver ion to metallic silver. Conventional photographic developers such as phenidone, hydroquinones, and catechol are useful, but hindered phenol reducing agents are preferred.

A wide range of reducing agents has been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and astorbit acid, such as 2,2'-bis(hydroxymethyl)propionylbetaphenyl hydrazide in combination with ascorbic acid; a combination of polyhydroxybenzene and hydroxylamine, a reductone and/or a hydrazine, e.g., a combination of hydroquinone and bis(ethoxyethyl)hydroxylamine, piperidinohexose reductone or formyl-4-methylphenylhydrazine, hydroxamic acids such as phenylhydroxamic acid, p-hydroxyphenylhydroxamic acid, and o-alaninehydroxamic acid; a combination of azines and sulfonamidophenols, e.g., phenothiazine and 2,6-dichloro-4-benzenesulfonamidophenol; α-cyanophenylacetic acid derivatives such as ethyl α-cyano-2-methylphenylacetate, ethyl α-cyano-phenylacetate; bis-o-naphthols as illustrated by 2,2'-dihydroxy-1-binaphthyl, 6,6'-dibromo-2,2'-dihydroxy-1,1'-binaphthyl, and bis(2-hydroxy-1-naphthyl)methane; a combination of bis-o-naphthol and a 1,3-dihydroxybenzene derivative, (e.g., 2,4-dihydroxybenzophenone or 2,4-dihydroxyacetophenone); 5-pyrazolones such as 3-methyl-1-phenyl-5-pyrazolone; reductones as illustrated by dimethylaminohexose reductone, anhydrodihydroaminohexose reductone, and anhydrodihydro-piperidone-hexose reductone; sulfamidophenol reducing agents such as 2,6-dichloro-4-benzenesulfonamidophenol, and p-benzenesulfonamidophenol; 2-phenylindane- 1,3-dione and the like; chromans such as 2,2-dimethyl-7-t-butyl-6-hydroxychroman; 1,4-dihydropyridines such as 2,6-dimethoxy-3,5-dicarbethoxy- 1,4-dihydropyridine; bisphenols, e.g., bis(2-hydroxy-3-t-butyl-5-methyl phenyl) methane; 2,2-bis(4-hydroxy-3-methylphenyl)propane; 4,4-ethylidene-bis(2-t-butyl-6-methylphenol); 1,1-bis(2-hydroxy-3,5-dimethylphenyl)-3,5,5-trimethylhexane; and 2,2-bis(3,5-dimethyl-4-hydroxyphenyl)propane; ascorbic acid derivatives, e.g., 1-ascorbylpalmitate, ascorbylstearate and unsaturated aldehydes and ketones, such as benzyl and diacetyl; 3-pyrazolidones; and certain indane-1,3-diones.

The reducing agent should be present as 1 to 12 percent by weight of the imaging layer. In multilayer constructions, if the reducing agent is added to a layer other than an emulsion layer, slightly higher proportions, of from about 2 to 15 percent, tend to be more desirable.

The Optional Dye Releasing Material

As noted earlier, the reducing agent for the reducible source of silver may be a compound that can be oxidized to form or release a dye.

Leuco dyes are one class of dye releasing material that forms a dye upon oxidation. The optional leuco dye may be any colorless or lightly colored compound that can be oxidized to a colored form, when heated, preferably to a temperature of from about 80° C. to about 250° C. (176° F. to 482° F.) for a duration of from about 0.5 to about 300 seconds and can diffuse through emulsion layers and interlayers into the image receiving layer of the element of the invention. Any leuco dye capable of being oxidized by silver ion to form a visible image can be used in the present invention. Leuco dyes that are both pH sensitive and oxidizable can be used but are not preferred. Leuco dyes that are sensitive only to changes in pH are not included within scope of dyes useful in this invention because they are not oxidizable to a colored form.

As used herein, the phases "change in color," "noxidized to a colored form," etc., include (1) a change from an uncolored or lightly colored state (optical density less than 0.2) to a colored state (an increase in optical density of at least 0.2 units), or (2) a substantial change in hue.

Representative classes of leuco dyes that are suitable for use in the present invention include, but are not limited to, bisphenol and bisnaphthol leuco dyes, phenolic leuco dyes, indoaniline leuco dyes, imidazole leuco dyes, azine leuco dyes, oxazine leuco dyes, diazine leuco dyes, and thiazine leuco dyes. Preferred classes of dyes are described in U.S. Pat. Nos. 4,460,681 and 4,594,307.

One class of leuco dyes useful in this invention are those derived from imidazole dyes. Imidazole leuco dyes are described in U.S. Pat. No. 3,985,565.

Another class of leuco dyes useful in this invention are those derived from so-called "chromogenic dyes." These dyes are prepared by oxidative coupling of a p-phenylenediamine with a phenolic or anilinic compound. Leuco dyes of this class are described in U.S. Pat. No. 4,594,307. Leuco chromogenic dyes having short chain carbamoyl protecting groups are described in copending application U.S. Ser. No. 07/939,093, incorporated herein by reference.

A third class of dyes useful in this invention are "aldazine" and "ketazine" dyes. Dyes of this type are described in U.S. Pat. Nos. 4,587,211 and 4,795,697.

Another preferred class of leuco dyes are reduced forms of dyes having a diazine, oxazine, or thiazine nucleus. Leuco dyes of this type can be prepared by reduction and acylation of the color-bearing dye form. Methods of preparing leuco dyes of this type are described in Japanese Patent No. 52-89131 and U.S. Pat. Nos. 2,784,186; 4,439,280; 4,563,415; 4,570,171; 4,622,395; and 4,647,525.

Also useful are neutral, phenolic leuco dyes such as 2-(3,5-di-t-butyl-4-hydroxyphenyl)-4,5,-diphenylimidazole, or bis(3,5-di-t-butyl-4-hydroxyphenyl)phenylmethane. Other phenolic leuco dyes useful in practice of the present invention are disclosed in U.S. Pat. Nos. 4,374,921; 4,460,681; 4,594,307; and 4,782,010.

The dyes formed from the leuco dye in the various color-forming layers should, of course, be different. A difference of at least 60 nm in reflective maximum absorbance is preferred. More preferably, the absorbance maximum of dyes formed will differ by at least 80–100 nm. When three dyes are to be formed, two should preferably differ by at least these minimums, and the third should preferably differ from at least one of the other dyes by at least 150 nm, and more preferably, by at least 200 nm. Any leuco dye capable of being oxidized by silver ion to form a visible dye is useful in the present invention as previously noted.

Other leuco dyes may be used in imaging layers as well, for example, benzylidene leuco compounds cited in U.S. Pat. No. 4,923,792, incorporated herein by reference. The reduced form of the dyes should absorb less strongly in the visible region of the electromagnetic spectrum and be oxidized by silver ions back to the original colored form of the dye. Benzylidene dyes have extremely sharp spectral characteristics giving high color purity of low gray level. The dyes have large extinction coefficients, typically on the order of $10^4$ to $10^5$ liter/mole-era, and possess good compatibility and heat stability. The dyes are readily synthesized and the reduced leuco forms of the compounds are very stable. Leuco dyes such as those disclosed in U.S. Pat. Nos. 3,442,224; 4,021,250; 4,022,617; and 4,368,247 are also useful in the present invention.

The dyes generated by the leuco compounds employed in the elements of the present invention are known and are disclosed, for example, in *The Colour Index*; The Society of Dyes and Colourists: Yorkshire, England, 1971; Vol. 4, p. 4437; Venkataraman, K. *The Chemistry of Synthetic Dyes*; Academic Press: New York, 1952; Vol. 2, p. 1206; and U.S. Pat. No. 4,478,927.

Leuco dye compounds may be readily synthesized by techniques known in the art. Suitable methods are disclosed, for example, in: F. X. Smith et al., *Tetrahedron Lett.* 1983, 24(45), 4951–4954; X. Huang., L. Xe, *Synth. Commun.* 1986, 16(13) 1701–1707; H. Zimmer et al. *J. Org. Chem.* 1960, 25, 1234–5; M. Sekiya et al. *Chem. Pharm. Bull.* 1972, 20(2),343; T. Sohda et al. *Chem. Pharm. Bull.* 1983, 31(2) 560–5; H. A. Lubs, The Chemistry of *Synthetic Dyes and Pigments*, Hafner, New York, N.Y., 1955, Chapter 5; H. Zollinger, *Color Chemistry: Synthesis, Properties and Applications of Organic Dyes and Pigments*, VCH, New York, N.Y., pp. 67–73, 1987; U.S. Pat. No. 5,149,807; and EPO Laid Open Application No. 0,244,399.

Further, as other image forming materials, materials where the mobility of the compound having a dye part changes as a result of an oxidation-reduction reaction with silver halide, or an organic silver salt at high temperature can be used, as described in Japanese Patent Application No. 165054 (1984). Many of the above-described materials are materials wherein an imagewise distribution of mobile dyes corresponding to exposure is formed in the photosensitive material by heat development. Processes of obtaining visible images by transferring the dyes of the image to a dye fixing material (diffusion transfer) have been described in the above described cited patents and Japanese Patent Application Nos. 168,439 (1984) and 182,447 (1984).

Another class of dye releasing compounds that form a dye upon oxidation are known as pre-formed-dye-release (PDR) or redox-dye-release (RDR) compounds. In these compounds the reducing agent for the organic silver compound releases a pre-formed dye upon oxidation. Examples of these compounds are disclosed in Swain, U.S. Pat. No. 4,981,775.

Still further, the reducing agent may be a compound that releases a conventional photographic dye coupler or developer on oxidation as is known in the art. When the heat developable, photosensitive material used in this invention is heat developed in a substantially water-free condition after or simultaneously with imagewise exposure, a mobile dye image is obtained simultaneously with the formation of a silver image either in exposed areas or in unexposed areas with exposed photosensitive silver halide.

The total amount of optional leuco dye used as a reducing agent utilized in the present invention should preferably be in the range of 0.5–25 weight percent, and more preferably in the range of 1–10 weight percent, based upon the total weight of each individual layer in which the reducing agent is employed.

The Binder

It is preferred that the binder be sufficiently polar to hold the other ingredients of the emulsion in solution. It is preferred that the binder be selected from polymeric materials, such as, for example, natural and synthetic resins, such as gelatin, polyvinyl acetals, polyvinyl chloride, polyvinyl acetate, cellulose acetate, polyolefins, polyesters, polystyrene, polyacrylonitrile, polycarbonates, methacrylate copolymers, maleic anhydride ester copolymers, butadiene-styrene copolymers, and the like. Copolymers, e.g. terpolymers, are also included in the definition of polymers. The polyvinyl acetals, such as polyvinyl butyral and polyvinyl formal, and vinyl copolymers such as polyvinyl acetate and polyvinyl chloride are particularly preferred. The binders can be used individually or in combination with one another. Although the binder may be hydrophilic or hydrophobic, it is preferably hydrophobic.

The binders are generally used at a level of from about 20 to about 80 percent by weight of the emulsion layer, and preferably from about 30 to about 55 percent by weight. Where the proportions and activities of the components require a particular developing time and temperature, the binder should be able to withstand those conditions. Generally, it is preferred that the binder not decompose or lose its structural integrity at 200° F. (90° C.) for 30 seconds, and more preferred that it not decompose or lose its structural integrity at 300° F. (149° C.) for 30 seconds.

Optionally these polymers may be used in combination of two or more thereof. Such a polymer is used in an amount sufficient to carry the components dispersed therein, that is, within the effective range of the action as the binder. The effective range can be appropriately determined by one skilled in the art.

Dry Silver Formulations

The formulation for the photothermographic emulsion layer can be prepared by dissolving and dispersing the binder, the photosensitive silver halide, the non-photosensitive source of reducible silver, the reducing agent for the non-photosensitive reducible silver source (as, for example, the optional leuco dye), and optional additives, in an inert organic solvent, such as, for example, toluene, 2-butanone, or tetrahydrofuran.

The use of "toners" or derivatives thereof which improve the image, is highly desirable, but is not essential to the element. Toners may be present in amounts of from 0.01 to 10 percent by weight of the emulsion layer, preferably from 0.1 to 10 percent by weight. Toners are well known materials in the photothermographic art as shown in U.S. Pat. Nos. 3,080,254; 3,847,612; and 4,123,282.

Examples of toners include phthalimide and N-hydroxyphthalimide; cyclic imides such as succinimide, pyrazoline-5-ones, and a quinazolinone, 1-phenylurazole, 3-phenyl-2-pyrazoline-5-one, quinazoline and 2,4-thiazolidinedione; naphthalimides such as N-hydroxy-1,8-naphthalimide; cobalt complexes such as cobaltic hexamine trifluoroacetate; mercaptans as illustrated by 3-mercapto-1,2,4-triazole, 2,4-dimercaptopyrimidine, 3-mercapto-4,5-diphenyl1,2,4-triazole and 2,5-dimercapto-1,3,4-thiadiazole; N-(aminomethyl)aryldicarboximides, e.g. (N,N-dimethylaminomethyl)-phthalimide, N-(dimethyl-aminomethyl)naphthalene-2,3-dicarboximide; and a combination of blocked pyrazoles, isothiuronium derivatives and certain photobleach agents, e.g., a combination of N,N'-hexamethylene-bis(1-carbamoyl-3,5-dimethylpyrazole), 1,8-(3,6-diaza-octane)bis(isothiuronium)trifluoroacetate and 2-(tribromomethylsulfonyl benzothiazole); merocyanine dyes such as 3-ethyl-5-[(3-ethyl-2-benzothiazolinylidene)-1-methyl-ethylidene]-2-thio-2,4-oazolidinedione; phthalazinone, phthalazinone derivatives, or metal salts of these derivatives such as 4-(1-naphthyl)phthalazinone, 6-chlorophthalazinone, 5,7-dimethoxyphthalazinone, and 2,3-dihydro-1,4-phthalazinedione; phthalazine and phthalizine derivatives; a combination of phthalazine plus phthalic acid derivatives, e.g., phthalic acid, 4-methylphthalic acid, 4-nitrophthalic acid, and tetrachlorophthalic anhydride; quinazolinediones, benzoxazine or naphthoxazine derivatives; rhodium complexes functioning not only as tone modifiers but also as sources of halide ion for silver halide formation in situ, such as ammonium hexachlororhodate (III), rhodium bromide, rhodium nitrate and potassium hexachlororhodate (III); inorganic peroxides and persulfates, e.g., ammonium peroxydisulfate and hydrogen peroxide; benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidines and asym-triazines, e.g., 2,4-dihydroxypyrimidine, 2-hydroxy-4-aminopyrimidine, and azauracil; and tetrazapentalene derivatives, e.g., 3,6-dimercapto-1,4-diphenyl-1H, 4H-2,3a,5,6a-tetrazapentalene, and 1,4-di(o-chlorophenyl)-3,6-dimercapto-1H, 4H-2,3a,5,6a-tetrazapentalene.

Silver halide emulsions used in this invention may be protected further against the production of fog and can be stabilized against loss of sensitivity during keeping. While not necessary for the practice of the invention, it may be advantageous to add mercury (II) salts to the emulsion layer(s) as an antifoggant. Preferred mercury (II) salts for this purpose are mereuric acetate and mereuric bromide.

Suitable antifoggants and emulsion stabilizers which can be used alone or in combination, include the thiazolium salts described in Staud, U.S. Pat. No. 2,131,038 and Allen U.S. Pat. No. 2,694,716; the azaindenes described in Piper, U.S. Pat. No. 2,886,437 and Heimbach, U.S. Pat. No. 2,444,605; the mercury salts described in Allen, U.S. Pat. No. 2,728,663; the urazoles described in Anderson, U.S. Pat. No. 3,287,135; the sulfocatechols described in Kennard, U.S. Pat. No. 3,235,652; the oximes described in Carrol et al., British Pat. No. 623,448; the polyvalent metal salts described in Jones, U.S. Pat. No. 2,839,405; the thiuronium salts described by Herz, U.S. Pat. No. 3,220,839; and palladium, platinum and gold salts described in Trivelli, U.S. Pat. No. 2,566,263 and Damschroder, U.S. Pat. No. 2,597,915.

Emulsions used in the invention can contain plasticizers and lubricants such as polyalcohols, e.g., glycerin and diols of the type described in Milton, U.S. Pat. No. 2,960,404; fatty acids or esters such as those described in Robins, U.S. Pat. No. 2,588,765 and Duane, U.S. Pat. No. 3,121,060; and silicone resins such as those described in DuPont British Patent No. 955,061.

Color photothermographic elements can include image dye stabilizers. Such image dye stabilizers are illustrated by U. K. Patent No. 1,326,889; and U.S. Pat. Nos. 3,432,300; 3,698,909; 3,574,627; 3,573,050; 3,764,337; and 4,042,394.

Photothermographic elements can be used in photographic elements which contain light absorbing materials and filter dyes such as those described in Sawdey, U.S. Pat. No. 3,253,921; Gaspar U.S. Pat. No. 2,274,782; Carroll et at., U.S. Pat. No. 2,527,583 and Van Campen, U.S. Pat. No. 2,956,879. If desired, the dyes can be mordanted, for example, as described in Milton, U.S. Pat. No. 3,282,699.

Photothermographic elements can contain matting agents such as starch, titanium dioxide, zinc oxide, silica, polymeric beads including beads of the type described in Jelley et al., U.S. Pat. No. 2,992,101 and Lynn, U.S. Pat. No. 2,701,245.

Photothermographic elements can contain antistatic or conducting layers, such as layers that comprise soluble salts, e.g., chlorides, nitrates, etc., evaporated metal layers, ionic polymers such as those described in Minsk, U.S. Pat. Nos. 2,861,056, and 3,206,312 or insoluble inorganic salts such as those described in Trevoy, U.S. Pat. No. 3,428,451.

The photothermographic dry silver emulsions of this invention may be constructed of one or more layers on a substrate. Single layer constructions should contain the reducible silver source, the silver halide, the spectral sensitizer, the reducing agent, and binder as well as optional materials such as toners, coating aids, and other adjuvants. Two-layer constructions should contain the silver source, the silver halide, and the spectral sensitizer in one emulsion layer (usually the layer adjacent to the substrate) and some of the other ingredients in the second layer or both layers, although two layer constructions comprising a single emulsion layer coating containing all the ingredients are envisioned. Multicolor photothermographic dry silver constructions may contain sets of these bilayers for each color or they may contain all ingredients within a single layer as described in U.S. Pat. No. 4,708,928. In the case of multilayer, multicolor photothermographic elements, the various emulsion layers are generally maintained distinct from each other by the use of functional or non-functional barrier layers between the various photosensitive layers as described in U.S. Pat. No. 4,460,681.

Development conditions will vary, depending on the construction used, but will typically involve heating the imagewise exposed article at a suitably elevated temperature, e.g. from about 80° C. to about 250° C., preferably from about 110° C. to about 200° C., for a sufficient period of time, generally from 1 second to 2 minutes.

In some methods, the development is carried out in two steps. Thermal development takes place at a higher temperature, e.g. about 150° C. for about 10 seconds, followed by thermal diffusion at a lower temperature, e.g. 80° C., in the presence of a transfer solvent. The second heating step at the lower temperature prevents further development and allows the dyes that are already formed to diffuse out of the emulsion layer to the receptor layer.

The Support

Photothermographic emulsions used in the invention can be coated on a wide variety of supports. The support or substrate can be selected from a wide range of materials depending on the imaging requirement. Typical supports include polyester film, subbed polyester film, poly(ethylene terephthalate) film, cellulose nitrate film, cellulose ester film, poly(vinyl acetal) film, polycarbonate film and related or resinous materials, as well as glass, paper, metal and the like. Typically, a flexible support is employed, especially a paper support, which can be partially acetylated or coated with baryta and/or an α-olefin polymer, particularly a polymer of an alphaolefin containing 2 to 10 carbon atoms such as polyethylene, polypropylene, ethylene butene copolymers and the like. Preferred polymeric materials for the support include polymers having good heat stability, such as polyesters. A particularly preferred polyester is polyethylene terephthalate.

Photothermographic emulsions used in this invention can be coated by various coating procedures including, wire wound rod coating, dip coating, air knife coating, curtain coating, or extrusion coating using hoppers of the type described in U.S. Pat. No. 2,681,294. If desired, two or more layers may be coated simultaneously by the procedures described in U.S. Pat. No. 2,761,791 and British Patent No. 837,095. Typical wet thickness of the emulsion layer can range from about 10 to about 100 micrometers ($\mu$m), and the layer can be dried in forced air at temperatures ranging from 20° C. to 100° C. It is preferred that the thickness of the layer be selected to provide maximum image densities greater than 0.2, and more preferably in the range 0.5 to 6.0 as measured by a MacBeth Color Densitometer Model TD 504.

Alternatively, the formulation may be spray-dried or encapsulated to produce solid particles, which can then be redispersed in a second, possibly different, binder and then coated onto the support.

The formulation for the emulsion layer can also include coating aids such as fluoroaliphatic polyesters. The emulsion layer may also include a protective topcoat.

Barrier layers, preferably comprising a polymeric material, may also be present in the photothermographic element of the present invention. Polymers for the material of the barrier layer can be selected from natural and synthetic polymers such as gelatin, polyvinyl alcohols, polyacrylic acids, sulfonated polystyrene, and the like. The polymers can optionally be blended with barrier aids such as silica.

The substrate with backside resistive heating layer may also be used in color photothermographic imaging article such as shown in U.S. Pat. Nos. 4,460,681 and 4,374,921.

The Image-Receiving Layer

The photothermographic element may further comprise an image-receiving layer. Images derived from the photothermographic elements employing compounds capable of being oxidized to form or release a dye, as for example, leuco dyes, are typically transferred to an image-receiving layer.

When the reactants and reaction products of photothermographic elements that contain compounds capable of being oxidized to form or release a dye remain in contact after imaging, several problems can result. For example, thermal development often forms turbid and hazy color images because of dye contamination of the reduced metallic silver image on the exposed area of the emulsion. In addition, the resulting prints tend to develop color in unimaged background areas. This "background stain" is caused by slow reaction between the dye-forming or dye-releasing compound and the reducible source of silver during storage. It is therefore desirable to transfer the dye formed upon imaging to a receptor, or image receiving layer.

The image-receiving layer of this invention can be any flexible or rigid, transparent layer made of thermoplastic polymer. The image-receiving layer preferably has a thickness of at least 0.1 micrometer, more preferably from about 1 to about 10 micrometers, and a glass transition temperature of from about 20° C. to about 200° C. In the present invention, any thermoplastic polymer or combination of polymers can be used, provided the polymer is capable of absorbing and fixing the dye. Because the polymer acts as a dye mordant, no additional fixing agents are required. Thermoplastic polymers that can be used to prepare the image-receiving layer include polyesters, such as polyethylene terephthalates; polyolefins, such as polyethylene; cellulosics, such as cellulose acetate, cellulose butyrate, cellulose propionate; polystyrene; polyvinyl chloride; polyvinylidine chloride; polyvinyl acetate; copolymer of vinylchloride-vinylacetate; copolymer of vinylidene chloride-acrylonitrile; copolymer of styrene-acrylonitrile; and the like.

The optical density of the dye image and even the actual color of the dye image in the image-receiving layer is very much dependent on the characteristics of the polymer of the image-receiving layer, which acts as a dye mordant, and, as such, is capable of absorbing and fixing the dyes. A dye image having a reflection optical density in the range of from 0.3 to 3.5 (preferably from 1.5 to 3.5) or a transmission optical density in the range of from 0.2 to 2.5 (preferably from 1.0 to 2.5) can be obtained with the present invention.

The image-receiving layer can be formed by dissolving at least one thermoplastic polymer in an organic solvent (e.g., 2-butanone, acetone, tetrahydrofuran) and applying the resulting solution to a support base or substrate by various coating methods known in the art, such as curtain coating, extrusion coating, dip coating, air-knife coating, hopper coating, and any other coating method used for coating solutions. After the solution is coated, the image-receiving layer is dried (e.g., in an oven) to drive off the solvent. The image-receiving layer may be strippably adhered to the photothermographic element. Strippable image receiving layers are described in U.S. Patent No. 4,594,307, incorporated herein by reference.

Selection of the binder and solvent to be used in preparing the emulsion layer significantly affects the strippability of the image-receiving layer from the photosensitive element. Preferably, the binder for the image-receiving layer is impermeable to the solvent used for coating the emulsion layer and is incompatible with the binder used for the emulsion layer. The selection of the preferred binders and solvents results in weak adhesion between the emulsion layer and the image-receiving layer and promotes good strippability of the emulsion layer.

The photothermographic element can also include coating additives to improve the strippability of the emulsion layer. For example, fluoroaliphatic polyesters dissolved in ethyl acetate can be added in an amount of from about 0.02 to about 0.5 weight percent of the emulsion layer, preferably from about 0.1 to about 0.3 weight percent. A representative example of such a fluoroaliphatic polyester is "Fluorad FC 431", (a fluorinated surfactant, available from 3M Company, St. Paul, Minn.). Alternatively, a coating additive can be added to the image-receiving layer in the same weight range to enhance strippability. No solvents need to be used in the stripping process. The strippable layer preferably has a delaminating resistance of 1 to 50 g/cm and a tensile strength at break greater than, preferably at least two times greater than, its delaminating resistance.

Preferably, the image-receiving layer is adjacent to the emulsion layer to facilitate transfer of the dye that forms after the imagewise exposed emulsion layer is subjected to thermal development, for example, in a heated shoe-and-roller type heat processor.

Multi-layer constructions containing blue-sensitive emulsions containing a yellow dye forming or dye releasing compound may be overcoated with green-sensitive emulsions containing a magenta dye forming or dye releasing compound. These layers may in turn be overcoated with a red-sensitive emulsion layer containing a cyan dye forming or dye releasing compound. Imaging and heating form the yellow, magenta, and cyan images in an imagewise fashion. The dyes so formed may migrate to an image-receiving layer. The image-receiving layer may be a permanent part of the construction or may be removable "i.e., strippably adhered" and subsequently peeled from the construction. Color-forming layers may be maintained distinct from each other by the use of functional or non-functional barrier layers between the various photosensitive layers as described in U.S. Pat. No. 4,460,681. False color address, such as that shown in U.S. Pat. No. 4,619,892, may also be used rather than blue-yellow, green-magenta, or red-cyan relationships between sensitivity and dye formation.

In another embodiment, the colored dye released in the emulsion layer can be transferred onto a separately coated image-receiving sheet by placing the exposed emulsion layer in intimate face-to-face contact with the image-receiving sheet and heating the resulting composite construction. Good results can be achieved in this second embodiment when the layers are in uniform contact for a period of time of from 0.5 to 300 seconds at a temperature of from about 80° C. to about 220° C.

Alternatively, a multi-colored image may be prepared by superimposing in register a single image-receiving sheet successively with two or more imagewise exposed photothermographic or thermographic elements, each of which release a dye of a different color, and heating to transfer the released dyes as described above. This method is particularly suitable for the production of color proofs especially when the dyes released have hues which match the internationally-agreed standards for color reproduction (SWOP colors). Dyes with this property are disclosed in U.S. Pat. No. 5,023,229. In this embodiment, the photothermographic or thermographic element preferably comprise compounds capable of being oxidized to release a preformed dye as this enables the image dye absorptions to be tailored more easily to particular requirements of the imaging system. When used in a photothermographic element, the elements are preferably all sensitized to the same wavelength range regardless of the color of the dye released. For example, the elements may be sensitized to ultra-violet radiation with a view toward contact exposure on conventional printing frames, or they may be sensitized to langer wavelengths, especially red or near infra-red to enable digital address by lasers.

The invention will now be further illustrated by the following examples, but the particular materials and amounts thereof recited in these examples, as well as other conditions and details, should not be construed to unduly limit this invention. All percentages are by weight unless otherwise indicated.

EXAMPLES

Starting materials used in the following examples were readily available from commercial sources such as Aldrich Chemical Co. (Milwaukee, Wis.) unless otherwise specified. All compounds were characterized by their $^1$H and $^{13}$C NMR and IR spectra. The following additional terms and materials were used.

Acryloid TM A-21 is a poly(methyl methacrylate) available from Rohm and Haas, Philadelphia, Pa.

Butvar TM B-76 and Butvar TM B-79 are poly(vinyl butyral) resins available from Monsanto Company, St. Louis, Mo.

CAO-5 TM is an antioxidant available from Rohm and Haas Co., Philadelphia, Pa.

CA 394-60S and CA 398-6 are cellulose acetate resins, available from Eastman Kodak Co.

CAB 171-15S is a cellulose acetate butyrate available from Eastman Kodak Co.

CBBA is 2-(4-chlorobenzoyl)benzoic acid. 2,7-Dimethoxy-1,4,5,8-tetrahydronaphthalene was prepared as described in J. A. Marshall; N. H. Anderson *J. Org. Chem.* 1965, 30, 1293.

FC-431 is a fluorinated polymeric surfactant available from 3M Company.

MEK is methyl ethyl ketone (2-butanone).

MBI is 2-mercaptobenzimidazole.

MMBI is 5-methyl-2-mercaptobenzimidazole.

4-MPA is 4-methylphthalic acid

MRA-1 is a 16% solids solution of a tertiary polymer made up of N-ethylperfluorooctanesulfonylamidoethyl-methacrylate/hydroxyethyl methacrylate/acrylic acid in a wt/wt ratio of 70/20/10 in ethyl acetate.

Permanax WSO is 1,1-bis(2-hydroxy-3,5-dimethylphenyl)-3,5,5-trimethylhexane [CAS RN=7292-14-0] and is available from Vulnax International, Ltd. It is a reducing agent (i.e., a developer) for silver ion. It is also known as Nonox.

PHP is pyridinium hydrobromide perbromide.

PHZ is phthalazine.

PET is poly(ethylene terephthalate).

TCPA is tetrachlorophthalic anhydride.

THDI is Desmodur TM N-100, is a commercially available poly-isocyanate crosslinking compound available from Mobay Chemical Co. It is used as a crosslinking agent for Butvar TM .

Anfifoggant-1 has the following structure:

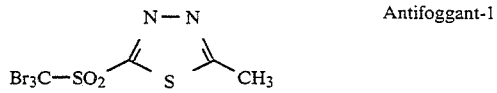

Antifoggant-1

Dye Synthesis

Dicarboxylic dye 1 was made in the following manner. A mixture of 3-(5'-carboxypentyl)benzothiazolium bromide (4.88 g, 14.0 mmol)and 2,7-dimethoxy-1,4,5,8-tetrahydronaphthalene (1.22 g, 6.35 retool) was fused at 130° C. for 5 min., the mixture was cooled and 10 mL of methanol and triethylamine (1.41 g, 14.00 mmol) were added, the mixture was refluxed for 25 rain, cooled overnight in the refrigerator and the crude product collected. After two recrystallizations from methanol, the yield of the purified dye was 0.55 g (14%); $\lambda_{max}$ (MeOH)=746 nm, $\epsilon = 2.46 \times 10^5$.

Monoalkyl-monocarboxylic acid dye 2 was made in the following manner. A mixture of 3-ethyl-2-methylbenzothiazolium p-toluenesulfonate (3.94 g, 11.3 mmol) and 2,7-dimethoxy-1,4,5,8-tetrahydronaphthalene (2.35 g, 12.2 mmol) was fused at 120° C. for 30 min. The mixture was cooled and 25 mL of methanol was added. To this mixture was added triethylamine (2.92 g, 29.0 retool) and 3-(2'-carboxyethyl)benzothiazolium bromide (4.43 g, 14.7 mmol). This solution was refluxed 20 min, cooled overnight in the refrigerator and the crude product collected. After 3 recrystallizations from methanol, the yield of purified dye was 2.78 g (43%); $\lambda_{max}$ (MeOH)=745 nm.

Dyes 3–9 were prepared in a similar maner from the appropriate benzothiazole and 2,7-dimethoxy-1,4,5,8-tetrahydronaphthalene.

Bis-ethylsubstituted dye C-1 is prepared as described by A. I. Tolmachev; Y. L. Slominskii; A. I. Kiprianov, *Doklady Akademii Nauk SSSR,* 1967, 177, 869–872. This sample was used as a control.

The wavelength of maximum absorption of many of dyes 1–9 and dyes C-3 and C-4 are shown below. Dyes C-1–C-4 are not within the scope of the invention and are shown for comparitive purposes.

Dye 1 $\lambda_{max}$ (MeOH) = 746 nm
Dye 2 $\lambda_{max}$ (MeOH) = 745 nm.
Dye 3 $\lambda_{max}$ (MeOH) = 758 nm.
Dye 4 $\lambda_{max}$ (MeOH) = 751 nm.
Dye 5 $\lambda_{max}$ (MeOH) = 774 nm.
Dye 6 $\lambda_{max}$ (Pyridine) = 762 nm.
Dye 7 $\lambda_{max}$ (Pyridine) = 762 nm.
Dye 9 $\lambda_{max}$ (MeOH) = 756 nm.
Dye C-3 $\lambda_{max}$ (MeOH) = 756 nm.
Dye C-4 $\lambda_{max}$ (MeOH) = 747 nm.

Non-limiting, representative dyes of this invention are shown below:

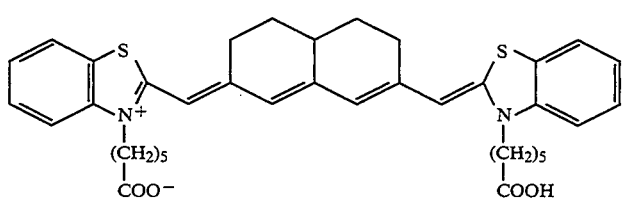

Dye 1

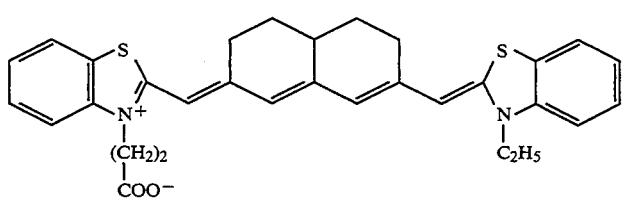

Dye 2

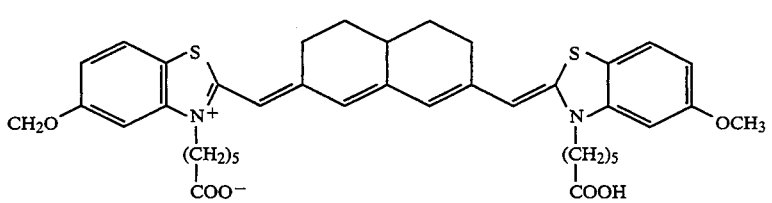

Dye 3

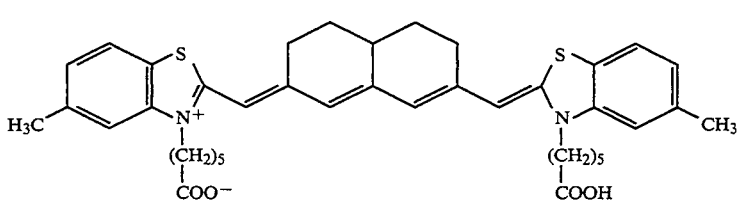

Dye 4

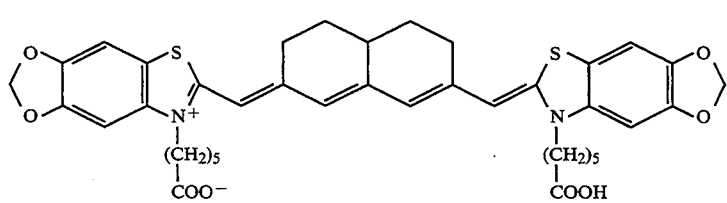

Dye 5

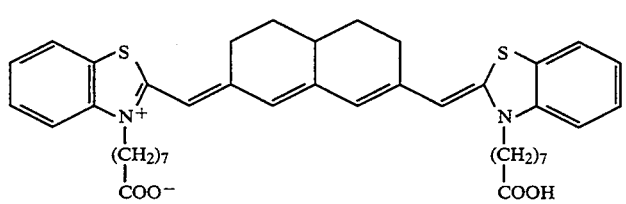

Dye 6

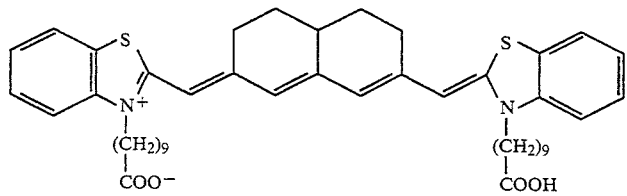
Dye 7
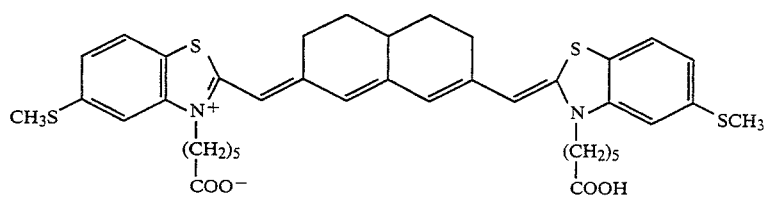
Dye 8
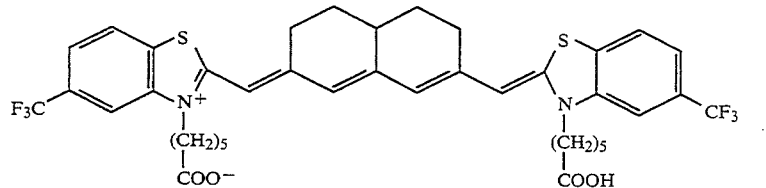
Dye 9
Dyes C-1 to C-4 were prepared for comparative purposes.
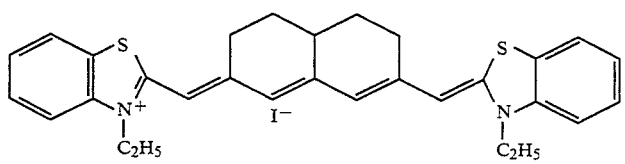
Dye C-1
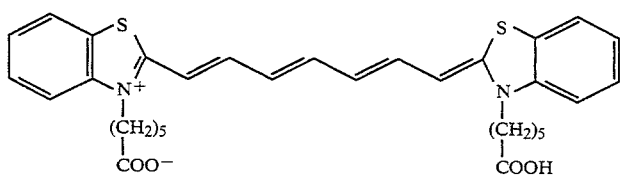
Dye C-2
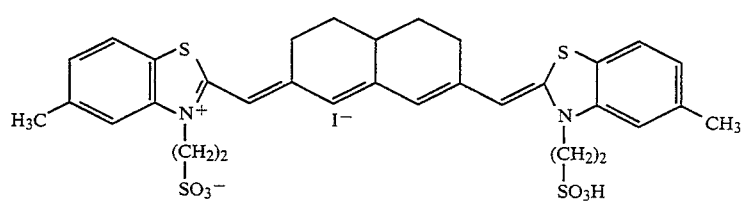
Dye C-3
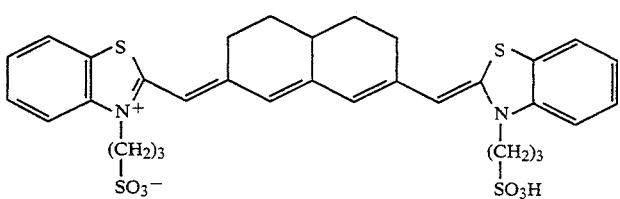
Dye C-4

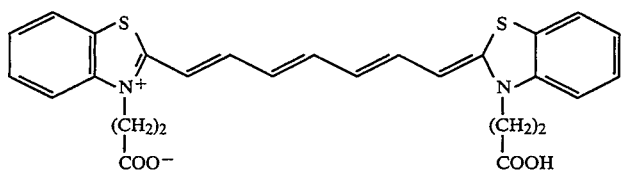

Dye C-5

Example 1

Preparation of Photothermographic Elements

A preformed core-shell-type photothermographic soap was prepared as shown below.

Preparation of Core-Shell-Type Silver Iodobromide Emulsion: A core-shell-type silver halide emulsion was prepared as described in Applicants' Assignees U.S. Patent Application entitled "Photothermographic Element with Core-Shell Type Silver Halide Grains" (Attorney Docket File No. 49685 USA 7A, filed Feb. 22, 1994.) To a first solution (Solution A) having 50–100 g of phthalated gelatin dissolved in 1500 ml of deionized water, held at a temperature between 30°–38° C., were simultaneously added; a second solution (Solution B) containing potassium bromide and potassium iodide, and a third solution (Solution C) which was an aqueous solution containing 1.4 to 1.8 moles silver nitrate per liter. pAg was held at a constant value by means of a pAg feedback control loop as described in Research Disclosure No. 17643, U.S. Pat. Nos. 3,415,650; 3,782,954; and 3,821,002. After a certain percentage of the total delivered silver nitrate was added, the second halide solution (Solution B), was replaced with Solution D (containing potassium bromide); and Solution C was replaced with Solution E (containing silver nitrate). In this manner a core of silver bromide/silver iodide with a shell of silver bromide was obtained.

The size of the emulsion grains was adjusted by controlling the addition rates, silver nitrate concentration, gelatin concentration in the kettle, and the kettle temperature.

The procedure for the preparation of 2 moles of emulsion is shown below.

| | |
|---|---|
| gelatin | 50 g |
| deionized Water | 1500 ml |
| 0.1 M KBr | 6 ml |
| adjust to pH = 5.0 with 3N HNO$_3$ | |

Solution B was prepared at 25° C. as follows:

| | |
|---|---|
| KBr | 28.0 g |
| KI | 2.5 g |
| deionized Water | 275.0 g |

Solution C was prepared at 25° C. as follows:

| | |
|---|---|
| AgNO$_3$ | 42.5 g |
| deionized Water | 364.0 g |

Solutions B and C were jetted into Solution A over 9.5 minutes. Solution D was prepared at 25° C. as follows:

| | |
|---|---|
| KBr | 179. g |
| deionized Water | 812. g |

Solution E was prepared at 25° C. as follows:

| | |
|---|---|
| AgNO$_3$ | 127. g |
| deionized Water | 1090. g |

Solutions D and E were jetted into Solution A over 28.5 minutes.

The emulsions were washed with water and then desalted. The photothermographic core-shell-type emulsion thus prepared contained a core of 6 mol % silver iodide and 94 mol % silver bromide and a shell of 100 mol % bromide with a grain size of 0.04 μm. Silver halide grain size was determined by Scanning Electron Microscopy (SEM).

Preparation of Preformed Silver Halide/Silver Organic Salt Dispersion: A silver halide/silver organic salt dispersion was prepared as described below. This material is also referred to as a silver soap dispersion or emulsion.

I. Ingredients 1. Preformed silver halide core-shell type emulsion prepared above-0.22 mole at 700 g/mole in 1.25 liter H$_2$O at 42° C. 2. NaOH 89.18 g in 1.50 liter H$_2$O 3. AgNO$_3$ 364.8 g in 2.5 liter H$_2$O 4. Fatty acid 131 g (Humko Type 9718) [available from Witco. Co., Memphis, Tenn.]5. Fatty acid 634.5 g (Humko Type 9022) [available from Witco. Co., Memphis, Tenn.]6. HNO$_3$ 19 ml in 50 ml H$_2$O II. Reaction 1. Dissolve ingredients #4 and #5 at 80° C. in 13 liter of H$_{20}$ and mix for 15 minutes. 2. Add ingredient #2 to Step 1 at 80° C. and mix for 5 minutes to form a dispersion. 3. Add ingredient #6 to the dispersion at 80° C., cooling the dispersion to 55° C. and stirring for 25 minutes. 4. Add ingredient #1 to the dispersion at 55° C. and mix for 5 minutes. 5. Add ingredient #3 to the dispersion at 55° C. and mix for 10 minutes. 6. Wash until wash water has a resistivity of 20,000 ohm/cm$^2$. 7. Dry at 45° C. for 72 hours.

Homogenization of Preformed Soaps (Homogenate): A preformed silver fatty acid salt homogenate was prepared by homogenizing 200 g of pre-formed soap, prepared above, in solvent and Butvar TM B-76 poly(vinyl butyral) according to the following procedure.

1. Add 200 g of preformed soap to 350 g of toluene, 1116 g of 2-butanone, and 33 g of Butvar TM B-76.

2. Mix the dispersion for 10 minutes and hold for 24 hours.

3. Homogenize at 4000 psi.

4. Homogenize again at 8000 psi.

Preparation of Photothermographic Coating Mixture: To 200.0 g of homogenized photothermographic dispersion was added 50.0 mL 2-butanone and 30.2 g of Butvar TM B-76 poly(vinyl butyral). The dispersion was stirred for 0.5 hr at room temperature. A solution of 0.18 g of pyridinium hydrobromide perbromide (PHP)

in 4 g of methanol was added. Stirring for 2 hours was followed by additon of 1.30 mL of a calcium bromide solution in methanol (1 g of calcium bromide in 10 mL of methanol). Stirring was maintained for 0.5 hr after which the temperature was lowered to 55° F. (12.8° C.) and the dispersion allowed to stand overnight without stirring. The dispersion was allowed to warm to room temperature, stirring was begun, and 6.56 g of Permanax TM was added over 15 minutes. To this was added 0.70 g of Antifoggant-1. Stirring was maintained for 15 minutes and 0.272 g of THDI in 2.25 g of 2-butanone was added. After 15 minutes, 1.00 g of 2-(4-chlorobenzoyl)benzoic acid, and either 0.0252 g of Dye-1, 0.0252 g of Dye-2, 0.0252 g of Dye C-1, or 0.0168 g of Dye C-2 in 5.04 g of methanol and 0.126 g of MMBI were added. Stirring was maintained for 2 hours.

The photothermographic emulsion was coated at 7 mil (178 μm) wet thickness onto a 3 rail (76.2 μm) clear polyester base by means of a knife coater and dried for 4 minutes at 175° F. (79.4° C.).

A topcoat solution was prepared by mixing the following materials:

```
47.6 g   acetone
25.  g   2-butanone
10.4 g   methanol
4.04 g   cellulose acetate (Eastman #398-6)
0.578 g  phthalazine
0.304 g  4-methylphthalic acid
0.202 g  tetrachlorophthalic acid
0.300 g  tetrachlorophthalic anhydride
```

The topcoat solution was then coated over the photothermographic silver layer at a 4 mil (102 μm) wet thickness and dried for 4 minutes at 175° F. (79.4 ° C.).

The following example demonstrates the increase in speed and lower $D_{min}$ for dyes of this invention.

The samples were imaged on a custom built sensitometer employing a 780 nm laser diode through a 0–3.6 neutral density wedge. $D_{min}$, $D_{max}$, Speed, and Relative Speed were determined using a custom built densitometer and are believed to be comparable to commercial instruments. Sensitometric results are shown below in Table 1.

TABLE 1

| Dye | $D_{min}$ | $D_{max}$ | Speed* | Relative Speed |
|---|---|---|---|---|
| Dye 1 | 0.087 | 3.616 | 2.695 | 495 |
| Dye 2 | 0.088 | 3.574 | 2.449 | 281 |
| Dye C-1 | 0.079 | 1.530 | 1.560 | 37 |
| Dye C-2 | 0.103 | 3.629 | 2.533 | 341 |

$D_{min}$ is the average of the eight lowest density values on the exposed side of the fiducial mark.
$D_{max}$ is the highest density value on the exposed side of the fiducial mark.
Speed is the Log 1/E + 4 corresponding to a density of 1.00 above $D_{min}$. E is the exposure in Ergs/cm$^2$.
Relative Speed is the antilog of the Speed.

Example 2

The following example demonstrates the increase in speed, lower Dmin and improved shelf-life stability after coating of the dyes of this invention. It also demonstrates that increase in speed is independent of the type of photothermographic emulsion used.

Preparation of Preformed Silver Iodobromide Emulsion: A silver halide-silver behenate dry soap was prepared by the procedures described in U.S. Pat. No. 3,839,049. The silver halide totaled 9% of the total silver while silver behenate comprised 91% of the total silver. The silver halide was silver bromoiodide and had a grain size of 0.04 μm with 2 mol % silver iodide and 98 mol% silver bromide.

Homogenization of Preformed Soaps (Homogenate): A preformed silver fatty acid salt homogenate was prepared by homogenizing 200 g of pre-formed soap, prepared above, in solvent and Butvar TM B-76 poly(vinyl butyral) according to the following procedure.

1. Add 200 g of preformed soap to 350 g of toluene, 1116 g of 2-butanone, and 33 g-of Butvar TM B-76.
2. Mix the dispersion for 10 minutes and hold for 24 hours.
3. Homogenize at 4000 psi.
4. Homogenize again at 8000 psi.

A photothermographic coating mixture for was prepared as follows:

Preparation of Photothermographic Coating (i.e., a silver trip): To 200.0 g of homogenized photothermographic dispersion was added 50.0 mL 2-butanone and 30.2 g of Butvar TM B-76 poly(vinyl butyral). The dispersion was stirred for 0.5 hr at room temperature. A solution of 0.18 g of pyridinium hydrobromide perbromide (PHP) in 4 g of methanol was added. Stirring for 2 hours was followed by addition of 1.30 mL of a calcium bromide solution in methanol (1 g of calcium bromide in 10 mL of methanol). Stirring was maintained for 0.5 hr after which the temperature was lowered to 55° F. (12.8° C.) and the dispersion allowed to stand overnight without stirring. The dispersion was allowed to warm to room temperature, stirring was begun, and 6.56 g of Permanax TM was added over 15 minutes. To this was added 0.70 g of Antifoggant-1. Stirring was maintained for 15 minutes and 0.272 g of THDI in 2.25 g of 2-butanone was added. After 15 minutes, 1.00 g of 2-(4-chlorobenzoyl)benzoic acid, and a solution of 0.038 mmol of Dye-1 or 0.029 mmol of Dye C-2 and 0.126 g of MMBI all in 5.04 g of methanol were added. Stirring was maintained for 2 hours.

The photothermographic emulsion was coated at 7 mil (178 μm) wet thickness onto a 3 mil (76.2 μm) clear polyester base by means of a knife coater and dried for 4 minutes at 175° F. (79.4° C.).

A topcoat solution was prepared by mixing the following materials:

```
47.6 g   acetone
25.  g   2-butanone
10.4 g   methanol
4.04 g   cellulose acetate (Eastman #398-6)
0.578 g  phthalazine
0.304 g  4-methylphthalic acid
0.202 g  tetrachlorophthalic acid
0.300 g  tetrachlorophthalic anhydride
```

The topcoat solution was then coated over the photothermographic silver layer at a 4 mil (102 μm) wet thickness and dried for 3 minutes at 175° F. (79.4° C.). The samples were imaged on a custom built sensitometer employing a nm laser diode through a 0–3.6 neutral density wedge. $D_{min}$, $D_{max}$, Speed, and Relative Speed were determined using a custom built densitometer and are believed to be comparable to commercial instruments. Sensitometric results are shown below in Table 2.

TABLE 2

| Dye | $D_{min}$ | $D_{max}$ | Speed* | Relative Speed |
|---|---|---|---|---|
| Dye 1 | 0.090 | 3.778 | 2.840 | 691 |

TABLE 2-continued

| Dye | $D_{min}$ | $D_{max}$ | Speed* | Relative Speed |
|---|---|---|---|---|
| Dye C-2 | 0.098 | 3.765 | 2.627 | 424 |

$D_{min}$ is the average of the eight lowest density values on the exposed side of the fiducial mark.
$D_{max}$ is the highest density value on the exposed side of the fiducial mark.
Speed is the Log 1/E + 4 corresponding to a density of 1.00 above $D_{min}$. E is the exposure in Ergs/cm².
Relative Speed is the antilog of the Speed.

Samples of each coating were aged for 14 days at 120° F./50% relative humidity and imaged as above. The results, shown below in Table 3, indicate photothermographic elements incorporating dyes of this invention exhibit improved resistance to increased $D_{min}$ on storage.

TABLE 3

| Dye | $D_{min}$ | $D_{max}$ | Speed* | Relative Speed |
|---|---|---|---|---|
| Dye 1 | 0.117 | 3.783 | 2.884 | 765 |
| Dye C-2 | 0.154 | 3.864 | 2.446 | 279 |

$D_{min}$ is the average of the eight lowest density values on the exposed side of the fiducial mark.
$D_{max}$ is the highest density value on the exposed side of the fiducial mark.
Speed is the Log 1/E + 4 corresponding to a density of 1.00 above $D_{min}$. E is the exposure in Ergs/cm².
Relative Speed is the antilog of the Speed.

Example 3

The following example compares dyes of this invention with dyes not having alkylcarboxy groups. As shown below, the dyes of this invention have increased speed. The exception is Dye 9, which contains strongly electron withdrawing groups. Coatings were prepared using the photothermographic emulsion described below.

A silver halide-silver behenate dry soap was prepared by the procedures described in U.S. Pat. No. 3,839,049. The silver halide totaled 9% of the total silver while silver behenate comprised 91% of the total silver. The silver halide was a 0.04 micron silver bromoiodide emulsion with 2% iodide.

A preformed silver/fatty acid salt homogenate was prepared similarly as in Example 2 except that Butvar TM B-79 was use in place of Butvar TM B-76.

A photothermographic coating mixture was prepared as follows:

704 g of homogenized photothermographic dispersion was stirred for 0.25 hr at 55° F. (12.8° C.) and a solution of 0.79 g of pyridinium hydrobromide perbromide (PHP) in 7.0 g of methanol was added. Stirring for 2 hours was followed by addition of 5.70 mL of a calcium bromide solution in methanol (1 g of calcium bromide in 10 mL in methanol). Stirring was maintained for 0.5 hours after which 137.5 g of Butvar TM B-79 poly(vinyl butyral) was added. After stirring for 0.5 hours, the dispersion was allowed to stand at 55° F. (12.8° C.) overnight without stirring. The next day, stirring was again begun, 25.74 g of Permanax TM WSO was added, and the dispersion allowed to stir for another 15 minutes. To this was added 3.00 g of Antifoggant-1. Stirring was maintained for another 15 minutes, 1.94 g of THDI in 17.0 g of 2-butanone was added, and the dispersion stirred for 15 minutes.

From this dispersion, 63 g was taken for each test sample. To each of these samples was added a solution containing 0.0054 to 0.0068 g of sensitizing dye (the amounts of dye varied so as to maintain equivalent mol amounts of sensitizing dye), 0.364 g of CBBA, and 0.032 g of MMBI all in 1.8 g of methanol was added and the sample allowed to mix for about 1.5 hours at room temperature before coating.

A topcoat solution was prepared by mixing the following materials at room temperature.

```
512 g   of 2-butanone
 61 g   of methanol
48.0 g  of CAB 171-15S
1.08 g  of tetrachlorophthalic anhydride
3.30 g  of phthalazinone
1.62 g  of 4-methylphthalic acid
1.6 g   of MRA-1
```

The samples were coated under infrared safelight conditions, using a dual knife coater and were coated onto the side opposite from the antihalation layer. The base was 7 mil (178 μm) thick blue tinted polyester film provided with an infrared antihalation coating absorbing at 780–820 nm. The coating knife for the photothermographic emulsion was set at 4.1 rail (104 μm) above the base. The coating knife for the topcoat was set at 5.6 mil (142 μm) above the base). The coatings were dried for 4 minutes at 175° F. (79.4° C.) in a Blue M TM oven.

Samples were imaged by exposing to an 811 nm laser diode through a 0–2.5 neutral density wedge. Sensitometric results are shown below in Table 4.

TABLE 4

| Dye | Speed* | Relative Speed |
|---|---|---|
| Dye 1 | 1.85 | 70 |
| Dye 4 | 1.74 | 55 |
| Dye 9 | Did not sensitize | |
| Dye C-2 | 1.58 | 38 |
| Dye C-4 | 1.25 | 18 |
| Dye C-5 | 1.56 | 36 |

Speed is the Log 1/E + 4 corresponding to a density of 1.00 above $D_{min}$. E is the exposure in Ergs/cm².
Relative Speed is the antilog of the Speed.

Example 4

The following example demonstrates the advantages of using a supersensitizer with dyes in this invention. Two identical samples containing the same dye and differing only in that one contained a supersensitizer and one did not were prepared. Three dyes were compared in this manner. Samples, were prepared, coated, imaged, and evaluated in a manner similar to that described in Example 3. The difference in speed between samples containing a supersensitizer and containing no supersensitizer is shown below as ΔSpeed. As shown below, the use of supersensitizers with the heptamethin cyanine dyes incorporating both a rigidized chain and at least one alkylcarboxy group provide increased speed when compared with dyes not having both these groups.

TABLE 5

| Dye | ΔSpeed* | ΔRelative Speed |
|---|---|---|
| Dye-1 | +0.80 | 6.30 |
| Dye-4 | +1.11 | 12.99 |
| Dye C-2 | +0.56 | 3.63 |

ΔSpeed* = speed with supersensitizer minus speed without supersensitizer (in log E). Positive values are an increase in sensitivity. As noted above, Speed is the Log 1/E + 4 corresponding to a density of 1.00 above $D_{min}$. E is the exposure in Ergs/cm².
ΔRelative Speed is the antilog of the ΔSpeed.

Reasonable modifications and variations are possible from the foregoing disclosure without departing from the spirit or scope of the present invention.

What we claim is:

1. A heat-developable, photothermographic element comprising a support bearing at least one photosensitive, image-forming photothermographic emulsion layer comprising:
   (a) a photosensitive silver halide;
   (b) a non-photosensitive, reducible silver source;
   (c) a reducing agent for silver ions;
   (d) a binder;
   (e) a supersensitizer; and
   (f) a spectrally sensitizing amount of an infrared absorbing dye compound having the central nucleus:

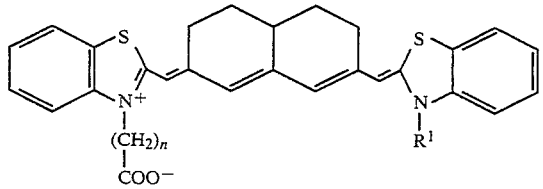

wherein:
  $R^1$ represents a $(CH_2)_n$—$COO^-$ group of from 1–20 carbon atoms, or an alkyl group of from 1 to 20 carbon atoms; and
  n is an integer from 1 to 20.

2. The photothermographic element of claim 1 wherein n is an integer from 1 to 10.

3. The photothermographic element of claim 1 wherein $R^1$ represents a $(CH_2)_n$—$COO^-$ group and n is an integer of from 1 to 10.

4. The photothermographic element of claim 1 wherein $R^1$ represents $C_2H_5$.

5. The photothermographic element of claim 1 wherein said infrared absorbing dye compound is selected from the group consisting of:

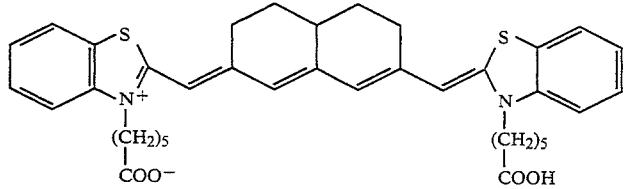

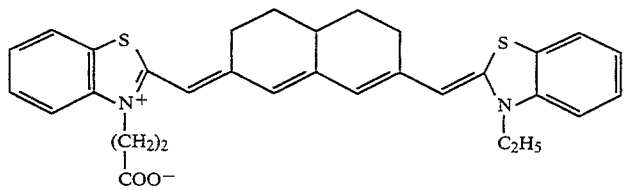

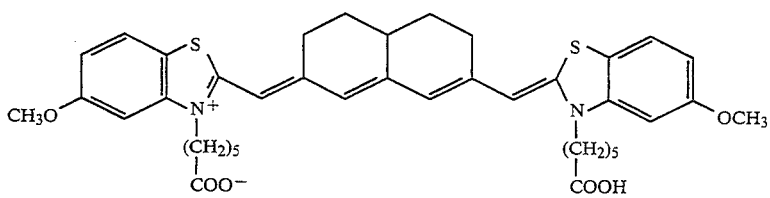

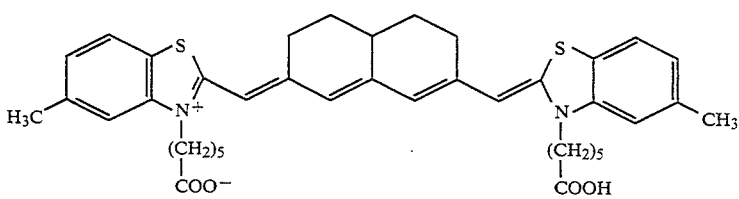

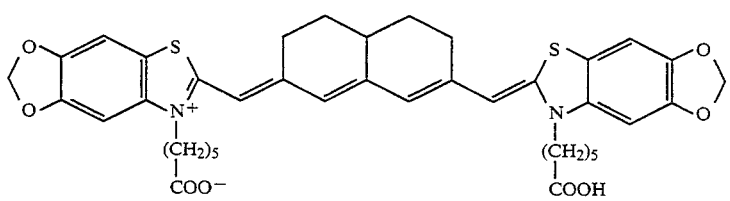

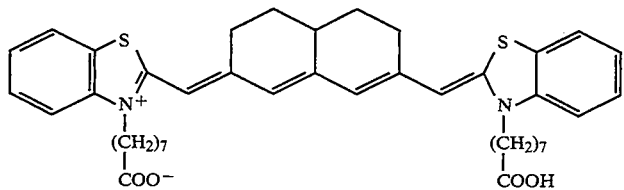

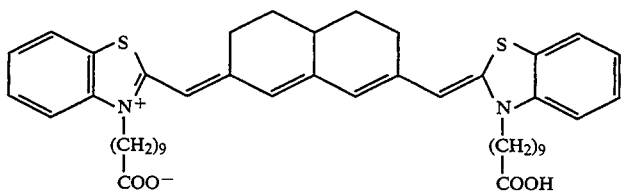

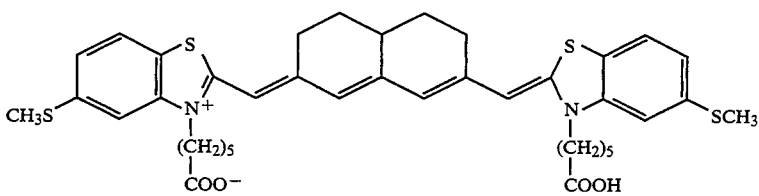

6. The photothermographic element of claim 1 wherein the concentration of said infrared absorbing dye compound is in the range $2 \times 10^{-8}$ to $4 \times 10^{-2}$ moles of dye per mole of silver in said emulsion layer.

7. The photothermographic element of claim 6 wherein the concentration of said infrared absorbing dye compound is in the range $2 \times 10^{-6}$ to $4 \times 10^{-3}$ moles of dye per mole of silver in said emulsion layer.

8. The photothermographic element of claim 1 wherein said emulsion layer comprises two or more sublayers.

9. The photothermographic element of claim 1 wherein said binder is a hydrophobic binder.

10. The photothermographic element of claim 9 wherein said binder is selected from the group consisting of polyvinylbutyral, cellulose acetate butyrate, cellulose acetate propionate, and vinyl resins.

11. The photothermographic element of claim 1 wherein reducible silver source comprises a silver salt of a fatty acid.

12. The photothermographic element of claim 1 wherein said supersensitizer is an aromatic, heterocyclic mercapto or disulphide compound.

13. The photothermographic element of claim 12 wherein said supersensitizer is selected from the group consisting of mercapto-substituted benzimidazoles, benzoxazoles, and benzothiazoles.

14. The photothermographic element of claim 13 wherein said supersensitizer is selected from the group consisting of 5-methyl-2-mercaptobenzimidazole, 2-mercaptobenzimidazole, 2-mercaptobenzoxazole, 2-mercaptobenzothiazole, and 2-mercapto-5-methylbenzimidazole.

* * * * *